United States Patent [19]

Morimoto et al.

[11] 4,356,402
[45] Oct. 26, 1982

[54] ENGINE GENERATOR POWER SUPPLY SYSTEM

[75] Inventors: Izumi Morimoto; Isao Sakamoto, both of Tokyo, Japan

[73] Assignee: Nippon Electric Co., Ltd., Tokyo, Japan

[21] Appl. No.: 267,887

[22] Filed: May 28, 1981

[30] Foreign Application Priority Data

Jun. 5, 1980 [JP] Japan .............................. 55/78322[U]

[51] Int. Cl.³ ................................................ H02J 1/10
[52] U.S. Cl. ......................................... 307/19; 307/23; 307/68; 307/70; 307/80; 307/85
[58] Field of Search ........................ 307/18, 19, 23, 64, 307/68, 70, 80, 85

[56] References Cited

U.S. PATENT DOCUMENTS 4,096,395  6/1978  Bogel et al. ....................... 307/70 X Primary Examiner—Michael L. Gellner
Attorney, Agent, or Firm—Blakely, Sokoloff, Taylor & Zafman

[57] ABSTRACT

An engine generator power supply system comprises a plurality of engine generators; a plurality of separate power feed lines for independently feeding power from respective engine generators to a plurality of loads respectively associated with the separate power feed lines; an electromagnetic contactor inserted in each of the power feed lines, the contactor being normally enabled for feeding power to the plurality of loads from one of the engine generators; and a controller for controlling such that the supply of power from a first engine generator to the plurality of loads is switched to the supply of power from a second engine generator to the plurality of loads at a predetermined time interval. The contactors are sequentially enabled upon the switching such that after a first contactor for the supply of power from the first engine generator to a first load is disabled, a second contactor for the supply of power from the first engine generator to a second load continues to be enabled; after disabling of the first contactor and during continued enabling of the second contactor, a third contactor for the supply of power from the second engine generator to the first load is enabled; and after disabling of the second contactor and during continued enabling of the third contactor, a fourth contactor for the supply of power from the second engine generator to the second load is enabled, so that the supply of power to one of the first and second loads is continuous upon the switching.

4 Claims, 11 Drawing Figures

4,356,402

ENGINE GENERATOR POWER SUPPLY SYSTEM

BACKGROUND OF THE INVENTION

This invention relates to an improvement of an engine generator power supply system including engine generators, acting as a service machine and a stand-by machine and adapted to be used in an over-horizon telecommunication system or the like, which has an operating equipment and a hot stand-by equipment.

In a radio repeater or the like installed on the top of a mountain where a commercial electric power source is not available, engine generators are generally used as a power source. Such engine generators are generally installed two or more, one as a service machine and the other as a spare machine. However, for the purpose of maintenance, the service and stand-by machines are switched every several hours to several hundreds hours. At the time of switching the service and stand-by machines, it is absolutely necessary to continuously supply power to the communication system, avoiding the interruption of communication. In the case of a DC power source, it is advantageous to use a DC non-brake power source comprising a storage battery and a battery charger.

However, such a communication system utilized as an over-horizon telecommunication high power transmitter requires a non-brake AC power source because of large power requirement. As a power source for supplying AC electric power to load, an engine generator power supply system has been used comprising existing and stand-by generators, and a synchronous switching device. Under a normal running state the engine generators are alternately operated to continuously supply AC electric power to loads, and at the time of switching of the engine generators, the synchronous switching device controls the frequencies, phases and voltages of a newly started engine generator synchronized with an operating engine generator, and after synchronizing them the load is switched to the newly started generator so as not to interrupt AC supply to the load. This method, however, requires a synchronous switching device which not only increases cost of system, but also complicates the power supply circuit.

Another system of non-brake AC power supply is also available which comprises engine generators, a rectifier, a storage battery and an inverter. This system is much more expensive than the synchronous switching device and has difficulties in maintenance of the system.

SUMMARY OF THE INVENTION

Accordingly, it is an object of this invention to provide an inexpensive and simple engine generator power supply system capable of continuously supplying AC electric power to a load, for instance a communication system, maintaining at least one communication system at an available state.

More particularly, such communication system as an over-horizon telecommunication system usually provided with a service equipment and a hot stand-by equipment for the purpose of maintaining high quality of the communication, signals are transmitted over several communication equipments so as not to interrupt the communication even when one communication equipment is turned off. According to this invention, this fact is utilized by sequentially switching the transmission equipment at the time of switching the engine generators whereby only one communication equipment is momentarily turned off without turning off the communication system. This enables switching of the engine generators without using an expensive synchronous switching device.

According to this invention, there is provided an engine generator power supply system comprising:

a plurality of engine generators;

a plurality of separate power feed lines for independency feeding power from respective engine generators to a plurality of loads respectively associated with the separate power feed lines;

contactor means inserted in each of the power feed lines, the contactor means being normally enabled for feeding power to the plurality of loads from one of the engine generators; and control means for controlling such that the supply of power from a first engine generator to the plurality of loads is switched to the supply of power from a second engine generator to the plurality of loads at a predetermined time interval, the contactors being sequentially enabled upon the switching such that after a first contactor for the supply of power from the first engine generator to a first load is disabled, a second contactor for the supply of power from the first engine generator to a second load continues to be enabled; after disabling of the first contactor and during continued enabling of the second contactor, a third contactor for the supply of power from the second engine generator to the first load is enabled; and after disabling of the second contactor and during continued enabling of the third contactor, a fourth contactor for the supply of power from the second engine generator to the second load is enabled, so that the supply of power to one of the first and second loads is continuous upon the switching.

BRIEF DESCRIPTION OF THE DRAWINGS

In the accompanying drawings:

FIG. 5b is a connection diagram showing details of the controller 41 shown in FIG. 5a; and FIGS. 6, 8 and 10 are timing charts useful to explain the operation of the embodiments shown in FIGS. 5, 7 and 9, respectively.

DESCRIPTION OF THE PREFERRED EMBODIMENTS

Figure 1:
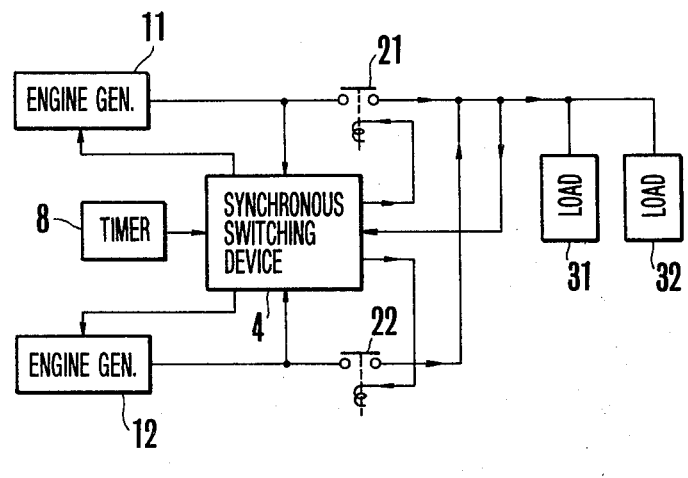
FIGS. 1 and 3 are block diagrams showing prior art AC non-brake power supply system.
Figure 2:
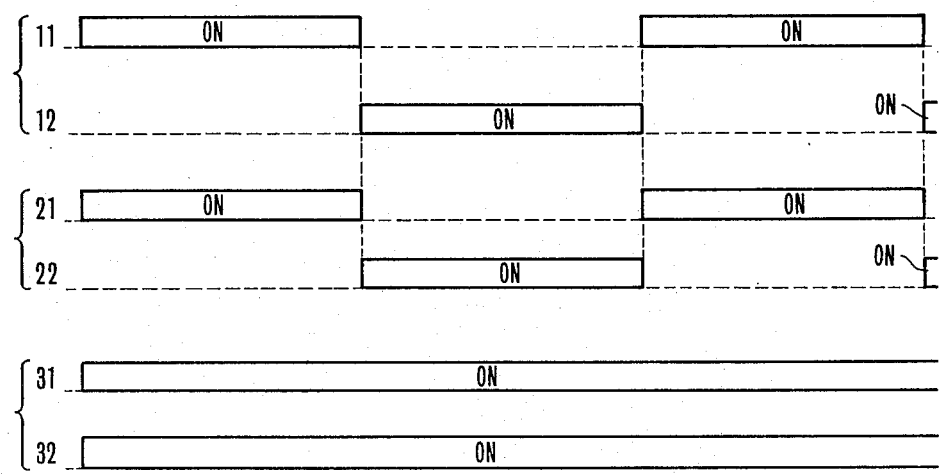
FIGS. 2 and 4 are timing charts useful to explain the operation of the system shown in FIGS. 1 and 3.

Prior art AC non-brake engine generator power supply system shown in FIG. 1 comprises two engine generators 11 and 12, electromagnetic contactors 21 and 22, loads 31 and 32, a synchronous switching device 4 including a synchronizing device and a load transfer device, and a timer 8 which are interconnected as shown and operate in the following manner. More particularly, the timer 8 alternately switches the engine generators 11 and 12 at a predetermined interval (for example, one day or one week), while the synchronous switching device 4 alternately operates the electromagnetic contactors 21 and 22 to supply electric power to the loads 31 and 32. Suppose now that the engine generator 12 is operating to supply its output to the loads 31 and 32 via electromagnetic contactor 22. At this time when the timer 8 operates to start the engine generator 11, the synchronizing device, not shown, operates to synchronize the output of the generator 11 with that of the generator 12. Then the electromagnetic contactor 21 is closed to supply the output of the generator 11 to the loads 31 and 32. At this time, the timer 8 is started again. Then the load transfer device changes the connection of the loads from generator 12 to the generator 11. Then, the electromagnetic contactor 22 is opened to disconnect the loads 31 and 32 from the generator 12 and the same is stopped. Thereafter, the timer 8 is started again to start the generator 12. The above-described cycle of operation is repeated, thus alternately operating the two generators 11 and 12 so as to ensure continuous supply of power to the loads 31 and 32. This construction, however, requires a synchronous switching device including a synchronizing device which controls the frequency, phase and voltage of relatively large power sources, and a load transfer device.

Figure 3:
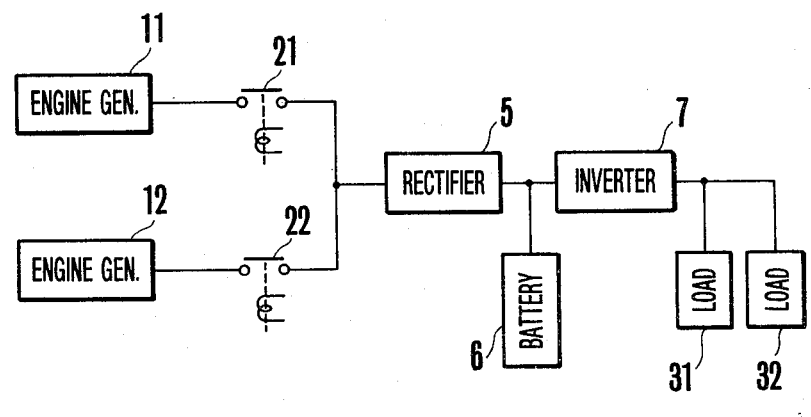
Figure 4:
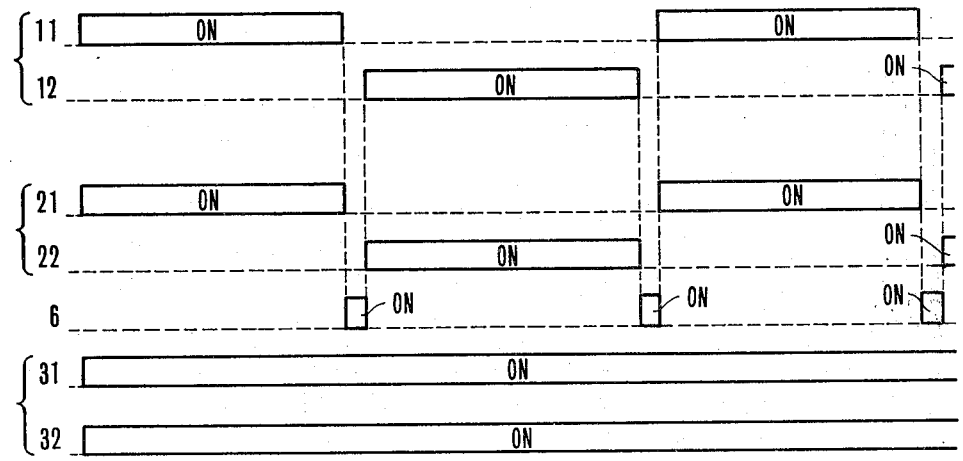

FIG. 3 shows another prior art AC non-brake engine generator power supply system of the type comprising two engine generators 11 and 12, a rectifier 5, a storage battery 6 and an inverter 7. Under a normal running state, the engine generators 11 and 12 are alternately operated to continuously generate an AC power, and it is rectified by the rectifier 5 so as to charge the floating storage battery 6. The inverter 7 converts the output direct current of the rectifier 5 into an AC power supplied to the AC loads 31 and 32. At the time of switching the engine generators, the battery 6 and inverter 7 continue to supply AC power to the loads. This construction is also complicated and expensive.

The first embodiment of this invention shown in FIG. 5a comprises electromagnetic contractors 21 to 24 each capable of switching a large current of the order of several hundreds amperes, and a controller or control circuit 41 which forms control signals for the electromagnetic contactors according to the timings to be described later.

At first, the engine generator 11 is operated to supply power to AC loads 31 and 32 through electromagnetic contactors 21 and 23 and separate power feed lines. When it is desired to switch the engine generators, the engine generator 12 is started to drive during the running of the engine generator 11. After building up of the voltage of the generator 12, the electromagnetic contactor 21 is opened, whereas the electromagnetic switch 24 is closed so as to energize the AC load 31 from generator 12 via the contactor 24 and an associated power feed line, while the load 32 is energized by the engine generator 11 via the electromagnetic contactor 23 and an associated power feed line. At the time of opening and closing the electromagnetic contactors 21 and 24 as described above, although the supply of power to the load 31 is momentarily interrupted, continuous supply of power to the load 32 is ensured because the electromagnetic contactor 23 is held closed. After the electromagnetic contactors 21 and 24 have been opened and closed respectively, and after the operation of the load 31 has become stable, the electromagnetic contactor 23 is opened, and then contactor 22 is closed. Then, the AC loads 31 and 32 would be supplied with power from the engine generator 12 via separate power feed lines. While the electromagnetic contactors 23 and 22 are operated, although power supply to the load 32 is momentarily interrupted, power is continuously supplied to the load 31 since the electromagnetic contactor 24 is being closed. Thus, during the switching of the engine generators, either one of the loads is energized thus ensuring continuous communication. After connecting the AC loads 31 and 32 to the engine generator 12, the engine generator 11 is stopped and reserved as a standby machine.

After the engine generator 12 has operated for a predetermined interval, the engine generator 11 is started for switching the connection of the loads 31 and 32 from the generator 12 to the generator 11 in the same manner as described above.

Figure 5A:
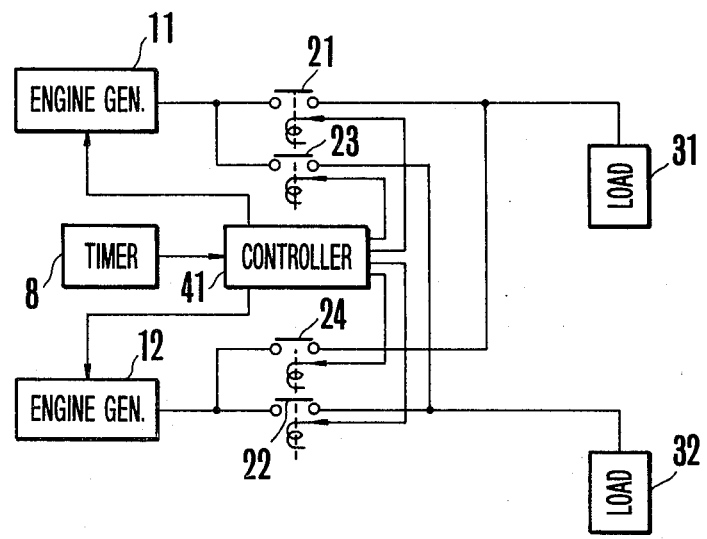
FIGS. 5a, 6 and 9 are block diagrams showing first, second and third embodiments according to this invention.
Figure 5B:
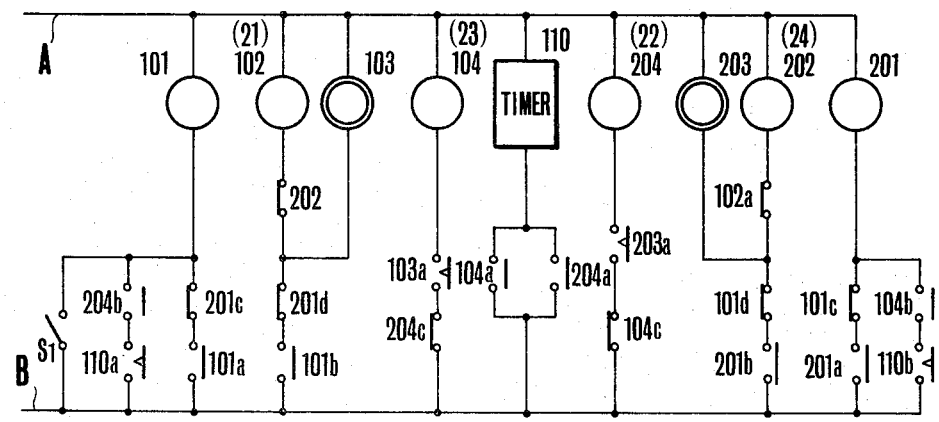

Referring to FIG. 5b showing details of the control circuit 41 shown in FIG. 5a, connected across a pair of source lines A and B to an AC or DC source, not shown, are relays 101, 102, 104, 204, 202 and 201 (including electromagnetic contactors and shown by simple circles), time delay relays 103 and 203 shown by double circles, and a timer 110 shown by a square. The time delay relays operate instantly when energized, and deenergized after a predetermined time. The timer 110 operates to produce a make signal for a predetermined time following a predetermined time after its energization. The electromagnetic contactors 21, 22, 23 and 24 respectively correspond to relays 102, 204, 104 and 202.

The control circuit shown in FIG. 5b operates as follows. For example, the engine generator 11 operates and switch S1 is closed, then relay 101 is energized to close its contact 101a to thereby establish its self-holding circuit. At the same time, since contact 101b of the relay 101 is also closed, the relay 102 (contactor 21) is energized to supply power to the load 31 from the engine generator 11. Since the time delay relay 103 is also energized concurrently with the relay 102, its contact 103a is closed to energize the relay 104 (contactor 24) so as to supply power to the load 32 from the engine generator 11. Concurrently with the closure of the relay 104, its contact 104a is also closed to start the timer 110.

Figure 6:
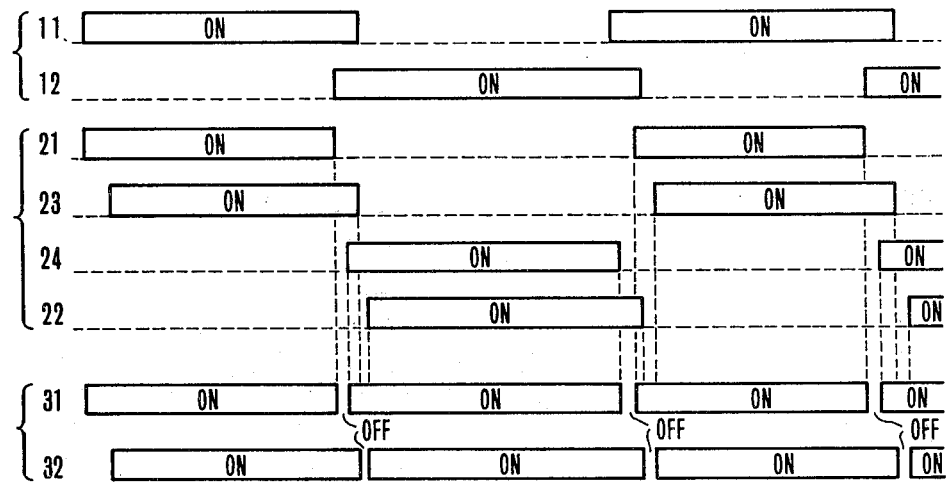

After a predetermined time (one week for example) the timer 110 operates, the engine generator 12 starts to operate and the contact 110b is closed. At this time, since the contact 104b of the relay 104 is being closed, the relay 201 would be energized. Then its contacts 201c and 201d open to deenergize the relays 101 and 102 to interrupt power supply to the load 31 from the engine generator 11. Closure of the contact 101c of the relay 101 and the contact 201a of the relay 201 establishes a self-holding circuit for the relay 201. Since the contacts 101d and 102a are closed, closure of the contact 201b energizes the relay 202 (contactor 24) to connect the load 31 to the engine generator 12. The time delay relay 103 opens after a predetermined time, to open its contact 103a, thus deenergizing the relay 104 (contactor 23) with the result that supply of power to the load 32 from the engine generator 11 would be interrupted. When the relay 104 is deenergized, its contact 104c is closed and since at this time the contact 203a of the relay 203 is being closed, the relay 204 (contactor 22) would be closed to connect the engine generator 12 to the load 32. As the relay 204 is energized, its contact 204c is closed to start the timer 110, thus repeating the same cycle of operation. Similar circuits having the performance as shown in the timing chart shown in FIG. 6 may be constructed by a proper combination of relays and timers.

Figure 7:
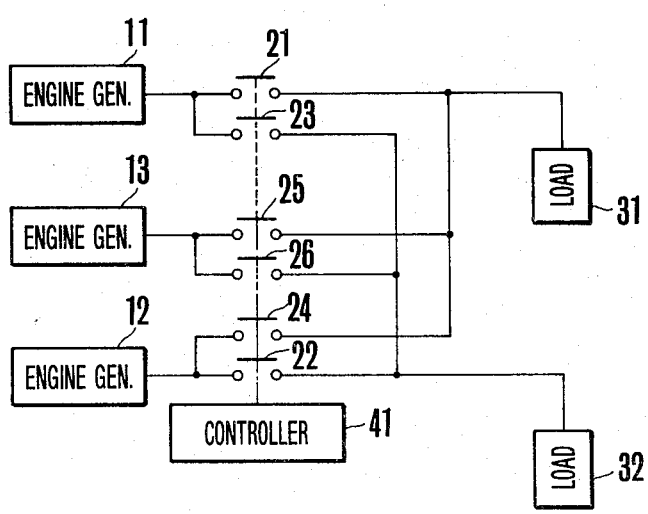
Figure 8:
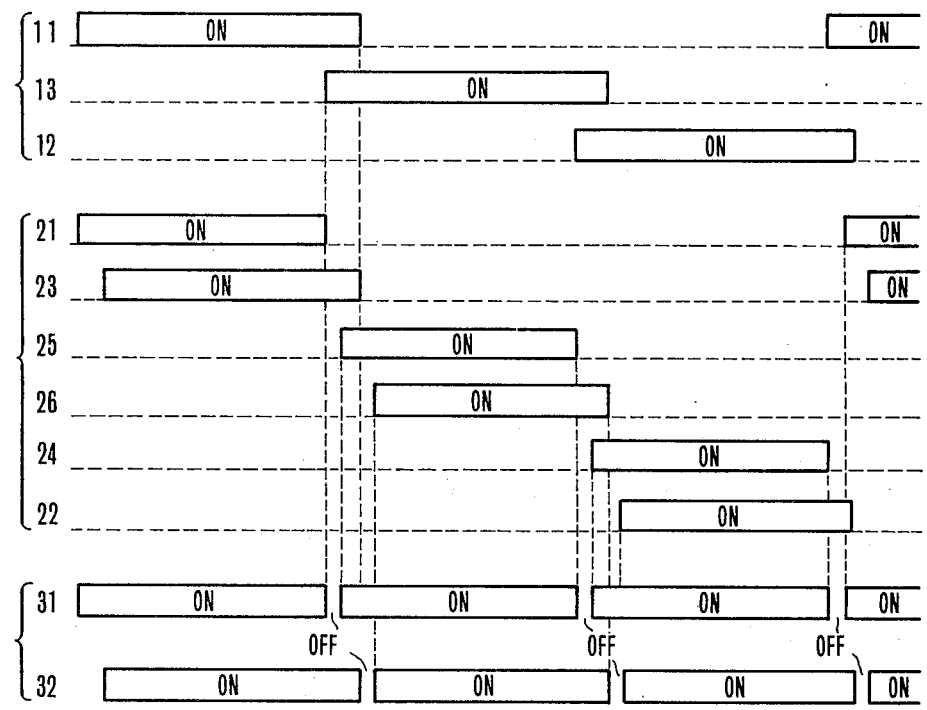

In the second embodiment shown in FIG. 7, three engine generators 11, 12 and 13 are provided for supplying AC power to two loads 31, 32, and the switchings are made according to the timing chart shown in FIG.

Figure 9:
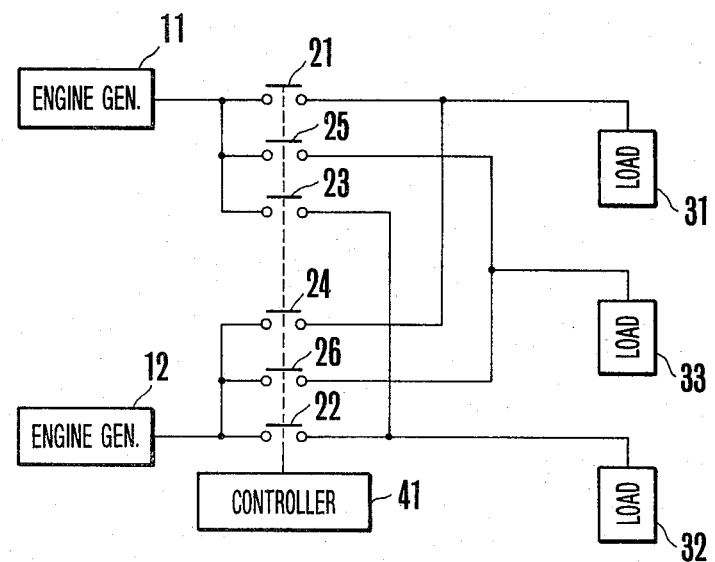
Figure 10:
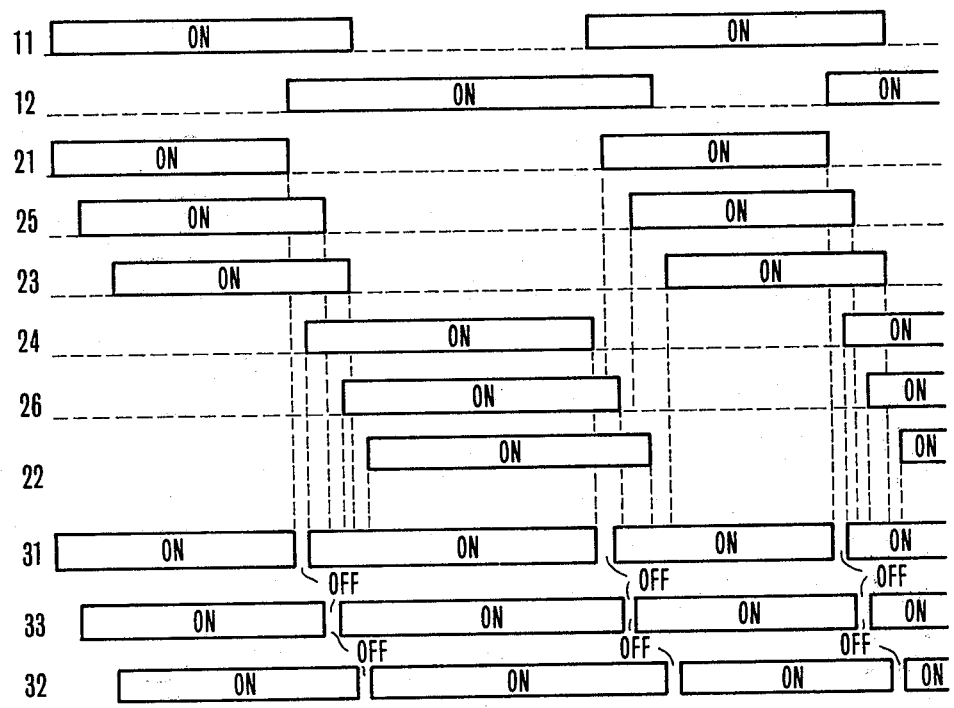

8. Where three loads 31, 32 and 33 and two engine generators 11 and 12 are provided as shown in FIG. 9, their switchings are made according to the timing chart shown in FIG. 10. In any case, by adding electromagnetic contactors 25 and 26, it is possible to always energize at least one of the loads at the time of switching the engine generators, thus continuing communication.

Although in FIGS. 7 and 9, the control circuit 41 are diagrammatically shown, it should be understood that they are constructed to on-off control electromagnetic contactors 21 through 26 at a predetermined sequence.

The switching of the engine generator is made at a regular interval of one per day or week. During the switching, although either one of the loads or the communication systems (one being presently used and the other being at hot stand-by) is interrupted from the power source for a short time of several seconds to several of tens of seconds, as the power supply to the other communication system is continued, there is no interruption of the communiction.

As described above, according to this invention, it is possible to always maintain communication without interruption during the switching of engine generators with simple and reliable switching device.

What is claimed is:

1. An engine generator power supply system comprising:
   a plurality of engine generator;
   a plurality of separate power feed lines for independently feeding power from respective engine generators to a plurality of loads respectively associated with the separate power feed lines;
   contactor means inserted in each of the power feed lines, said contactor means being normally enabled for feeding power to said plurality of loads from one of the engine generators; and
   control means for controlling such that the supply of power from a first engine generator to the plurality of loads is switched to the supply of power from a second engine generator to the plurality of loads at a predetermined time interval,
   said contactors being sequentially enabled upon said switching such that after a first contactor for the supply of power from the first engine generator to a first load is disabled, a second contactor for the supply of power from said first engine generator to a second load continues to be enabled; after disabling of said first contactor and during continued enabling of said second contactor, a third contactor for the supply of power from said second engine generator to the first load is enabled; and after disabling of said second contactor and during continued enabling of said third contactor, a fourth contactor for the supply of power from said second engine generator to the second load is enabled, so that the supply of power to one of the first and second loads is continuous upon said switching.

2. A system according to claim 1 wherein said loads comprise radio communication systems.

3. A system according to claim 2 wherein said electric communication systems comprise radio repeaters.

4. A system according to claim 1 wherein said control means comprises a plurality of relays, a plurality of electromagnetic contactors connected between said generators and loads, and a timer for controlling said control means, and time delay relays connected in parallel with some of said electromagnetic contactors, and wherein each of said relays and said electromagnetic contactors is provided with auxiliary contacts connected to control operations of the other relays, the other electromagnetic contactors and of said timer.

* * * * *